K. BERGER.
HOOK.
APPLICATION FILED JUNE 6, 1918.

1,289,616.

Patented Dec. 31, 1918.
2 SHEETS—SHEET 1.

INVENTOR:
Knute Berger
BY
Pierre Barnes
ATTORNEY

UNITED STATES PATENT OFFICE.

KNUTE BERGER, OF SEATTLE, WASHINGTON.

HOOK.

1,289,616.  Specification of Letters Patent.  Patented Dec. 31, 1918.

Application filed June 6, 1918. Serial No. 238,457.

*To all whom it may concern:*

Be it known that I, KNUTE BERGER, a subject of the King of Norway, residing at Seattle, in the county of King and State of Washington, have invented certain new and useful Improvements in Hooks, of which the following is a specification.

The object of my invention is the provision of a logging hook of the type known as choker or bull-hooks which possesses superior advantages with respect to convenience, security and general efficiency.

The invention consists in a hook having a mousing or guard connected by a swivel device to the hook-shank and a novel locking element for releasably securing the guard in its operative position.

Figure 1:
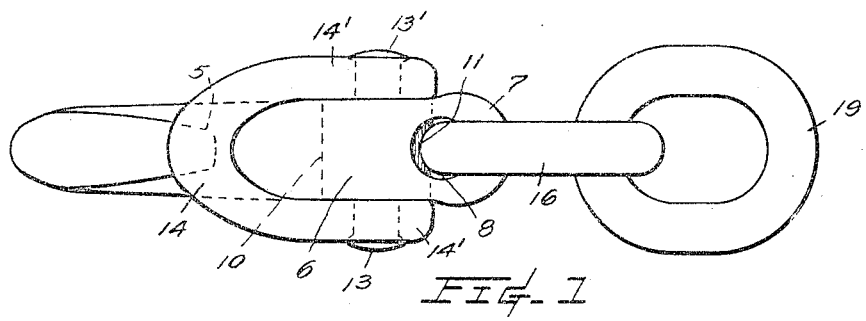
Figure 2:
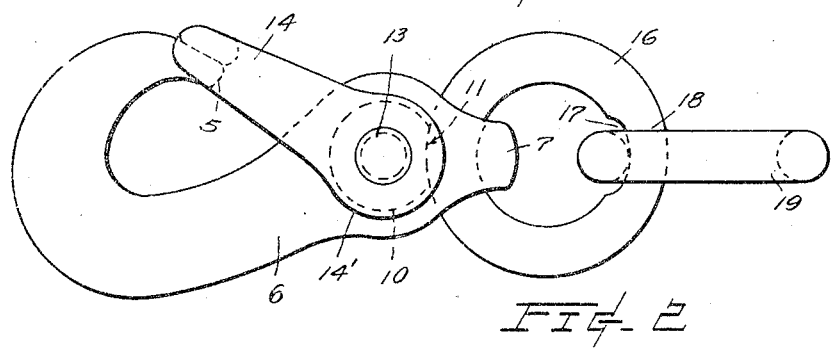
Figure 3:
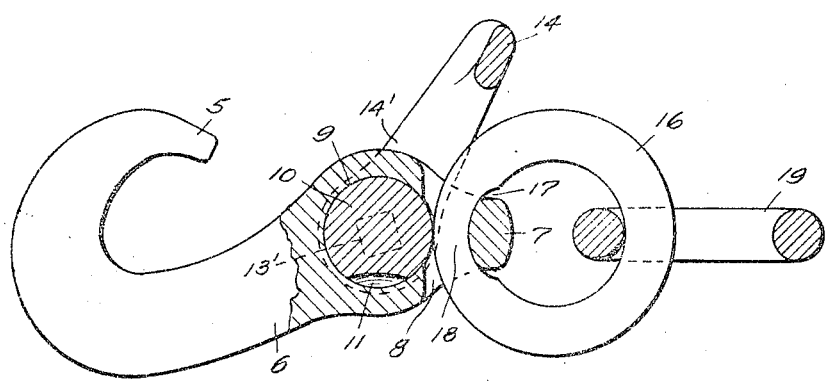
Figure 4:
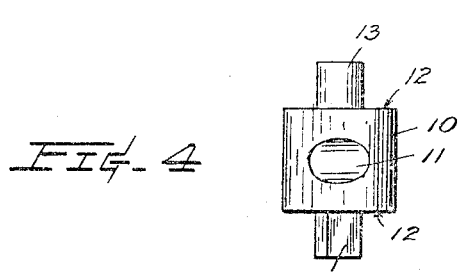
Figure 5:
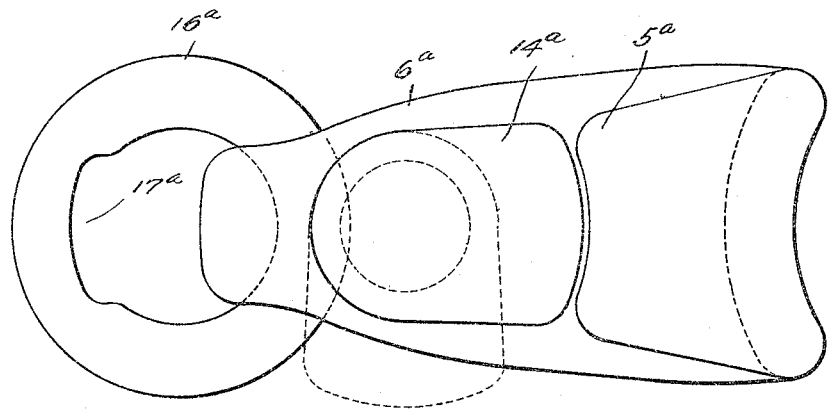
Figure 6:
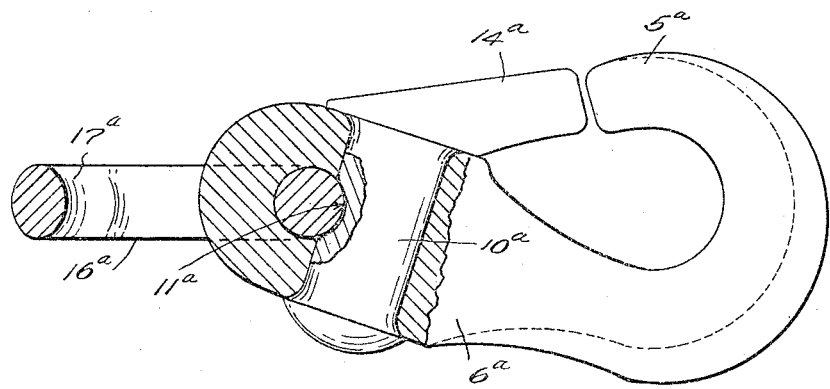

In the accompanying drawings, Figure 1 is a plan view of an embodiment of the invention shown in its preferred form and with the guard illustrated in position to close the mouth of the hook. Fig. 2 is a side elevation of the same. Fig. 3 is a view thereof partly in side elevation and partly in vertical section, with the guard in inoperative position. Fig. 4 is a detached plan view of the swivel block shown in the preceding views. Fig. 5 is a plan view of a modified form of the invention. Fig. 6 is a side elevation of the same, shown partly in section.

Referring now to Figs. 1 to 4, inclusive, the hook proper is formed with a bill 5 and a shank 6 having in its end 7 an eye 8.

The shank is also provided with a cylindrical aperture 9 arranged transversely of the hook and in rectangular relation with the eye 8 with which it communicates, as shown in Fig. 3. Rotatably mounted in said aperture is a cylindrical block 10 provided in its periphery with a circumferentially arranged groove or recess 11.

The length of said block is equal to or slightly greater than the width of the shank and protruding axially from the ends or shoulders 12 of the block are studs 13 and $13^1$, one of which is desirably polygonal in cross section. 14 represents a guard or mousing for the mouth 15 of the hook, said guard being preferably of a U-shape and is rigidly secured against the block shoulders 12 by riveting the studs 13 and $13^1$ in correspondingly shaped holes provided therefor in the guard legs $14^1$. Engaged in the hook eye 8 is an annular locking element 16 provided interiorly with a notch 17 to provide a reduced portion 18 which, upon being positioned in the hook eye 8 affords space in the latter to enable the block 10 being rotated to swing the guard 14 into or from its inoperative position in which it is shown in Fig. 3. When the guard is swung into its operative position upon the hook bill 5, as illustrated in Figs. 1 and 2, the block recess 11 will be opposed to the shank part 7 thereby affording space which constitutes, in effect, a part of the hook eye 8 and affords space to rotate the element 16 into locking position by engaging in the block recess. In practice the locking element, moreover, is turned from its disengaged position (Fig. 3) a one-half rotation to present the notch 17 in position to receive a hauling cable or a shackle or ring 19 to which said cable, not shown, is attached.

The block recess 11 is of an arcuate shape, preferably, in cross section and of a size to have its bottom fit against the locking element 16 when in its Fig. 2 position thereby serving to secure the block so as to retain the guard in position to close the mouth of the hook. When under a strain with the ring 19 engaged in the notch 17 the element 16 is prevented from being turned in the hook eye, causing the guard to be reliably held in position to close the mouth of the hook and thereby obviate all danger of brush or other trash being caught by the hook-bill in addition to preventing the accidental unshipping of the choker line from the hook.

To release the locking element so that the reduced portion 18 thereof may be moved into the hook eye 8 it is necessary that the referred to hauling line be rendered slack.

In the modified form of the invention, see Figs. 5 and 6, the guard $14^a$ is in the nature of a finger integral with and extending from a cylindrical block or pin $10^a$ swiveled in the hook shank $6^a$ so that the guard is in a plane substantially rectangular to the axis of the pin and adapted to be rotated about such axis to and from the hook bill $5^a$.

The pin $10^a$, similar to the block 10 of the afore-described embodiment of the invention, is provided with a recess $11^a$ in which is engaged a locking element $16^a$ having a corresponding notch $17^a$.

The operation of the modified construction is similar to that of the preferred form and will be understood from the foregoing explanation.

What I claim, is—

1. A hook having a guard pivotally connected to its shank and rotary means extending through the hook shank whereby the guard may be controlled to retain the same in position to close the gap between the shank and bill of the hook, said means also affording means whereby the hook may be connected to a hauling cable.

2. In a device of the class described, a hook having an eye in its shank, a mousing for said hook, a block rigidly secured to said mousing and rotatable in the hook-shank, a locking element extending through the hook eye and adapted to be regulated to be in engaged or disengaged relations selectively with said block whereby the mousing is respectively held in operative position or is freely movable therefrom.

3. In a device of the class described, the combination with a hook provided with an eye in its shank, a guard, and a block rigidly connected to said guard and pivotally connected with the hook shank to afford movements of said guard to and from the hook-bill, of a locking element extending through said hook eye and adapted to be rotated into or from engagement with said block, said locking element also serving as a link whereby a hauling line may be connected to the hook-shank.

4. A device of the class described comprising a hook, a guard, a block rigidly secured to said guard and rotatably mounted in the shank of said hook whereby the guard may be swung into and out of position to close the mouth of the hook, said block device being provided with a peripheral recess, and an annular locking element rotatably connected to the hook-shank and adapted to serve when in one rotary position to engage in said recess to retain the guard in operative relation with the hook-bill, and when in another rotary position to afford movement to the guard for withdrawing the same from said hook-bill.

5. In a device of the class described, the combination with a hook having in its shank an eye and an aperture communicating therewith, and a guard for the mouth of the hook, of a block rotatable in said aperture and rigidly secured to the guard, said block being provided with a recess in its periphery, and an annular locking element revoluble in said eye and recess when the guard is in its operative position to thus secure the guard, said element being provided with a portion of relatively small thickness which, upon being revolubly brought into said eye, enables the guard to be moved into its inoperative position.

Signed at Seattle Washington, this 18th day of May 1918.

KNUTE BERGER.

Witnesses:
PIERRE BARNES,
HANNAH JONES.

Copies of this patent may be obtained for five cents each, by addressing the "Commissioner of Patents, Washington, D. C."